US012567028B2

(12) United States Patent
Ahuja et al.

(10) Patent No.: US 12,567,028 B2
(45) Date of Patent: Mar. 3, 2026

(54) LARGE LINE ITEM EVENT PROCESSING SYSTEM

(71) Applicant: SAP SE, Walldorf (DE)

(72) Inventors: Monika Ahuja, Bangalore (IN); Ranjith Pavanje Raja Rao, Bangalore (IN); Ganesh Choudhary, Bangalore (IN)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 17/886,733

(22) Filed: Aug. 12, 2022

(65) Prior Publication Data

US 2023/0419251 A1 Dec. 28, 2023

(30) Foreign Application Priority Data

Jun. 27, 2022 (IN) .............................. 202211036710

(51) Int. Cl.
*G06Q 10/087* (2023.01)
*G06F 16/93* (2019.01)
*G06Q 30/08* (2012.01)

(52) U.S. Cl.
CPC ........... *G06Q 10/087* (2013.01); *G06F 16/93* (2019.01); *G06Q 30/08* (2013.01)

(58) Field of Classification Search
CPC ....... G06Q 10/087; G06Q 30/08; G06F 16/93
See application file for complete search history.

(56) References Cited

U.S. PATENT DOCUMENTS

| | | | |
|---|---|---|---|
| 11,216,444 B2 | 1/2022 | Busjaeger et al. | |
| 11,710,088 B1 * | 7/2023 | Anand ............. | G06Q 10/06316 705/7.26 |
| 2005/0010521 A1 * | 1/2005 | Mueller ................. | G06Q 30/06 705/37 |
| 2014/0149170 A1 | 5/2014 | Britton et al. | |
| 2021/0240818 A1 * | 8/2021 | Seksenov .............. | G06F 16/986 |
| 2022/0237184 A1 * | 7/2022 | Saxena ................... | G06F 9/505 |

FOREIGN PATENT DOCUMENTS

EP 3165982 5/2017

OTHER PUBLICATIONS

Joao Eduardo Ferreira, Large Scale Order Processing through Navigation Plan Concept, Dec. 11, 2006, IEEE International Conference on Services Computing (Year: 2006).*
"European Application Serial No. 23180761.1, Extended European Search Report mailed Oct. 27, 2023", 13 pgs.

* cited by examiner

*Primary Examiner* — Aaron N Tutor
(74) *Attorney, Agent, or Firm* — SCHWEGMAN LUNDBERG & WOESSNER, P.A.

(57) ABSTRACT

In an example embodiment, a scalable solution is provided that identifies sourcing events that are large line item events and reroutes requests for operations related to such events to a specialized content service. The specialized content service authenticates the requests and causes data pertaining to the large line item events to be stored in and/or retrieved from a document database for LLI event processing. The result is that operations for LLI events are able to be processed much faster than in prior art solutions.

20 Claims, 11 Drawing Sheets

700

LARGE LINE ITEM EVENT PROCESSING SYSTEM

CLAIM OF PRIORITY

The present patent application claims the priority benefit of the filing date of Indian Provisional Application No. 202211036710 filed Jun. 27, 2022, the entire content of which is incorporated herein by reference.

BACKGROUND

Strategic sourcing can be performed by a company to monitor and evaluate sourcing strategies. Sourcing strategies can include determining from which entity to purchase items that need to be procured. Strategic sourcing can include supply chain management, supplier development, contract negotiation, and outsourcing evaluation.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
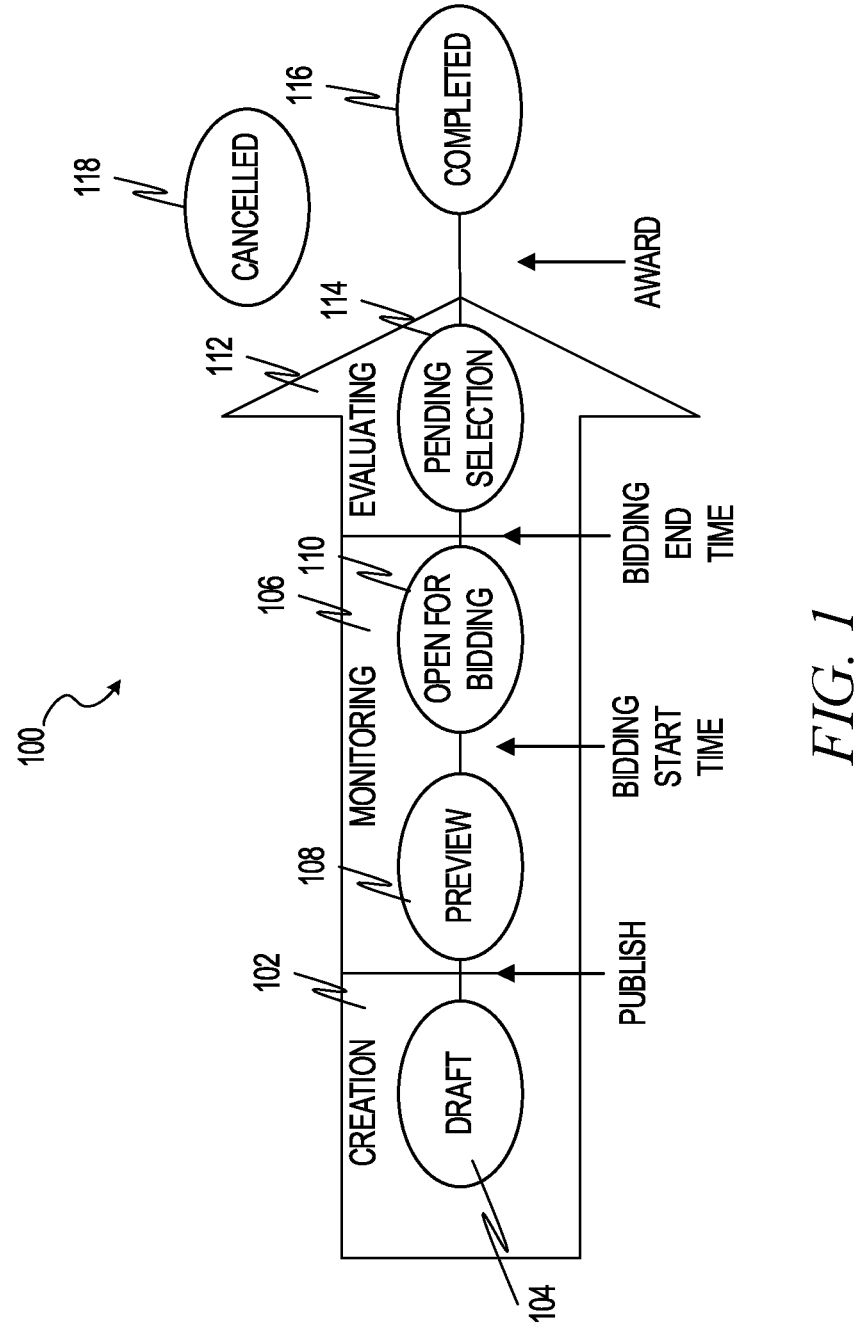
FIG. 1 is a diagram illustrating a lifecycle of an LLI event, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Organizations may wish to procure item(s) for the organization. For example, an organization may wish to find a supplier who can provide the item(s) at the lowest price. Other factors can influence selection of a supplier, such as past interactions, overall reputation, delivery time factors, etc. Strategic sourcing can be a process for trying to find a best supplier for the organization for a set of one or more items that the organization wants to procure. After performing the strategic analysis, a supplier can be selected and awarded a sourcing opportunity.

An input to strategic sourcing can be a sourcing event that includes a list of line item(s) that the organization wants to procure. Line items for a sourcing event can be defined using a user interface that has fixed fields into which values for line items can be added. The data pertaining to the sourcing event is then stored in a relational database for later retrieval for subsequent sourcing events and/or analysis.

A technical issue, however, is encountered for sourcing events that have a large amount of data. Users expect for events to be processed within 30 second or less, and sourcing events with large amounts of data (e.g., over 2000 line items and/or over 125 participants) are not able to be processed within that 30 second limit. This is because a server cache will hold up events in memory. Additionally, the fetching of sourcing event data with large amounts of data would also be time consuming. As a result, the fixed field graphical user interface typically will limit input sourcing events to "standard-size"-only, namely sourcing events with fewer than 2000 line items. Large sourcing events, known as Large Line Item (LLI) events, are handled separately via spreadsheet input, and are not stored in the same database as the standard event data, limiting reporting and analysis features.

There is risk, however, in changing the existing core sourcing application, as most events (greater than 90%) are of standard size as opposed to LLI, and the existing core sourcing application is quite stable and effective for such standard-size events.

In an example embodiment, a scalable solution is provided that identifies sourcing events that are large line item events and reroutes requests for operations related to such events to a specialized content service. The specialized content service authenticates the requests and causes data pertaining to the large line item events to be stored in and/or retrieved from a document database for LLI event processing. The result is that operations for LLI events are able to be processed much faster than in prior art solutions.

In sourcing, an event proceeds through multiple processing steps, starting with event creation by organizations and ending with a selection to "winning" suppliers. At each stage of the process, the event has a defined status which determines the actions a user can take. FIG. 1 is a diagram illustrating a lifecycle 100 of an LLI event, in accordance with an example embodiment. A creation process 102 involves the creation of a draft LLI event 104, which can then be published. A monitoring process 106 involves the previewing 108 of a bidding process as well as event 110 where the LLI event is open for bidding. Once bidding time is over, an evaluation process 112 takes over and a pending selection of a "winner" is made 114. Once the bid has been awarded, a completed event 116 occurs, or if at any point during the monitoring process 106 or evaluation process 112 the bidding is cancelled, a cancelled event 118 occurs.

There are functionalities at each of these event lifecycle stages where large amounts of data must be handled within defined service level agreements (SLAs). For example, an expected SLA for a content upload with 20,000 line items may be 30 seconds, as may be an expected SLA for a bid upload with 20,000 line items. Report generation with 20 supplier bids may have an expected SLA of 2 minutes, with concurrent processing of 200 supplier bids having an expected SLA of 10 minutes.

Figure 2:
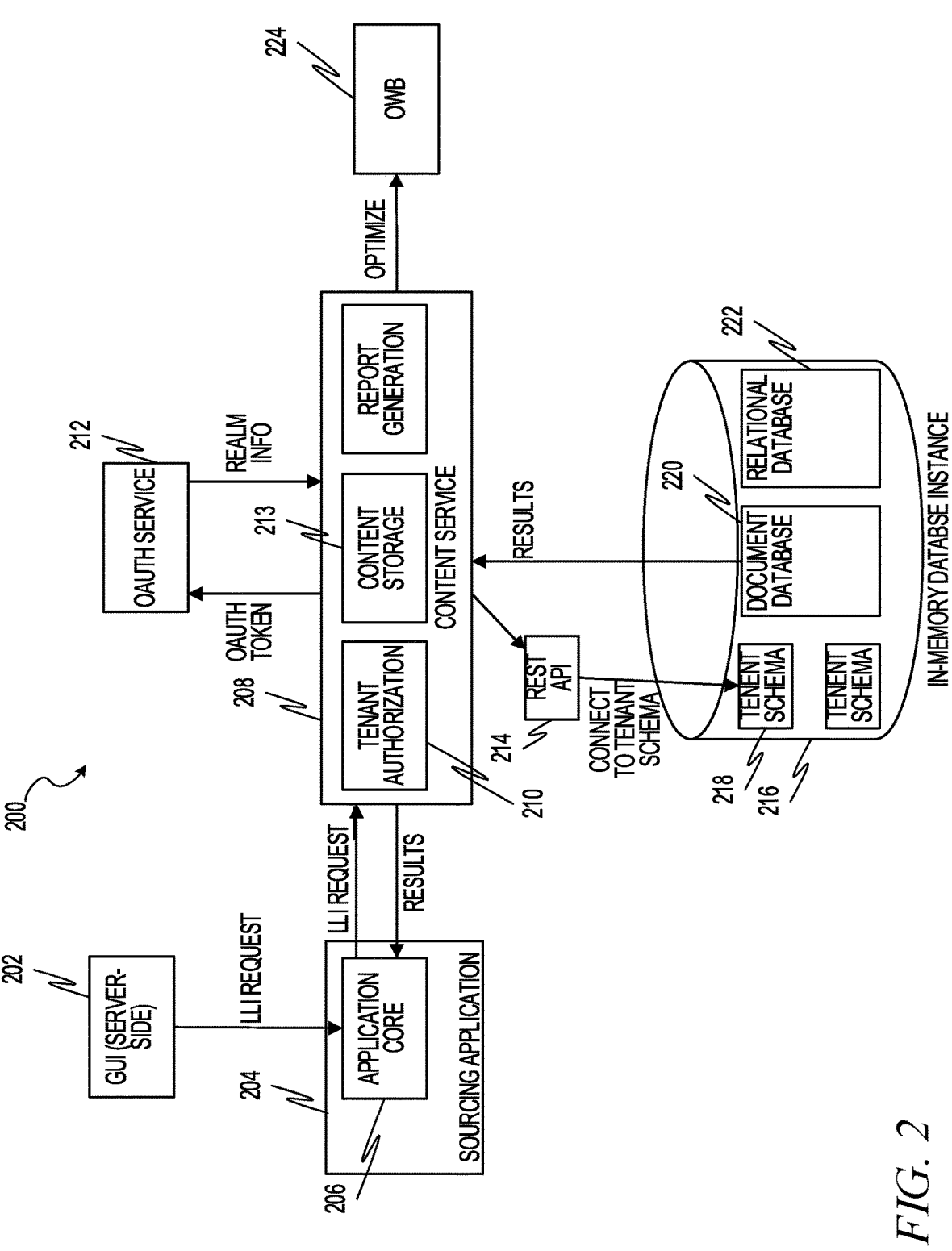
FIG. 2 is a block diagram illustrating a system for processing LLI events in accordance with an example embodiment.

FIG. 2 is a block diagram illustrating a system 200 for processing LLI events in accordance with an example embodiment. A graphical user interface 202 may permit users to enter fixed line items for a sourcing event and/or request reporting on a sourcing event. It should be noted that the graphical user interface 202 displayed here may be a server-based graphical user interface, which may communicate with a client device running a client-side portion of a sourcing application 204 to perform the various graphical user interface operations requested. This, however, is not mandatory. In other example embodiments, the graphical user interface 202 may be client-based, and thus may, for example, be contained within the client-side portion of the sourcing application 204.

A user can use the sourcing application 204 to create a sourcing event. A sourcing event can be an auction request, a request for information (RFI), a request for a proposal, or a request for quotation (which can all generically be referred to as RFX (e.g., request for "X")). The sourcing event can be sent from the graphical user interface 202 to the application core 206.

The application core 206 may receive an event request from the graphical user interface 202. Notably, this event request could be a request to provide or utilize data from any of the event lifecycle stages, such as the stages described above with respect to FIG. 1. Also notably, the event requests may correspond to standard events or LLI events. In an example embodiment, a standard event is defined as an event involving 2000 or fewer line items, while a LLE event is defined as an event involving more than 2000 line items. This threshold, however, can be different depending upon implementation. For purposes of this disclosure, it is enough that the application core 206 know how to differentiate between a standard event and an LLI event. This is because LLI event processing is going to be abstracted from the integration component into a microservice-based stack that is backed by a document database.

In an example embodiment, the application core 206 may be an S/4 Hana™ cloud, from SAP SE of Frankfurt, Germany. S/4 Hana™ is a modular cloud enterprise resource processing (ERP) software running with an in-memory database. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access.

The core 206 determines whether event request corresponds to an LLI event or a standard event. If it corresponds to an LLI event, then the request is rerouted to a content service 208, which is a microservice-based stack that is backed by a document database. More particularly, a tenant authentication component 210 within the content service 208 acts to verify the tenant for the LLI request, by sending an OAuth token to OAuth service 212 for verification. Once verified, realm information is sent from the OAuth service 212 to the tenant authentication component 210, which then uses the realm information to fetch a tenant identification.

The tenant authentication component 210 then indicates the LLI request has been validated, and a content storage component 213 forwards the LLI request to a representational state transfer (REST) Application program Interface (API) 214, which then uses a tenant-specific in-memory database instance 216 (identified using the tenant identification) to connect to a tenant schema 218. The tenant schema 218 identifies content/bid data in a document database 220 as well as metadata in a relational database 222. This allows the REST API 214 to perform whatever operations are necessary to satisfy the LLI request using a combination of content/bid data and metadata. These operations may include Create, Read, Update and Delete (CRUD) operations.

Notably, the line item data itself are stored in the document database 220. There are two types of information provided for line items for an event: one from a procuring organization and another from supplier organizations who provide the bids for the line items. Thus, the data is semi-structured in nature, and varies on the terms provided by the procuring organization and the bid values provided by the suppliers. Since faster reads and writes are needed for the large amount of data in LLI events, a document database 220 is used instead of relying on the relational database 222 for such storage.

A document database is a non-relational database that stores information as documents (as opposed to as in tables, as in a relational database). A document typically stores information about one object, and any of its related metadata, as a record in the document database 220. Documents store data in field-value pairs. These values can be a variety of types and structures, including strings, numbers, dates, arrays, or objects. Documents can be stored in a variety of formats, although in one example embodiment the documents are stored as Javascript™ Object Notation (JSON) files. The documents may be grouped into collections in the document database 220.

If report generation is needed as part of the LLI request, then a report generation component can generate the report. Furthermore, content service 208 may also communicate data retrieved via the LLI requests to one or more other applications, such as an optimization workbench (OWB) 224, which can perform bid analysis and optimization scenarios.

Figure 3:
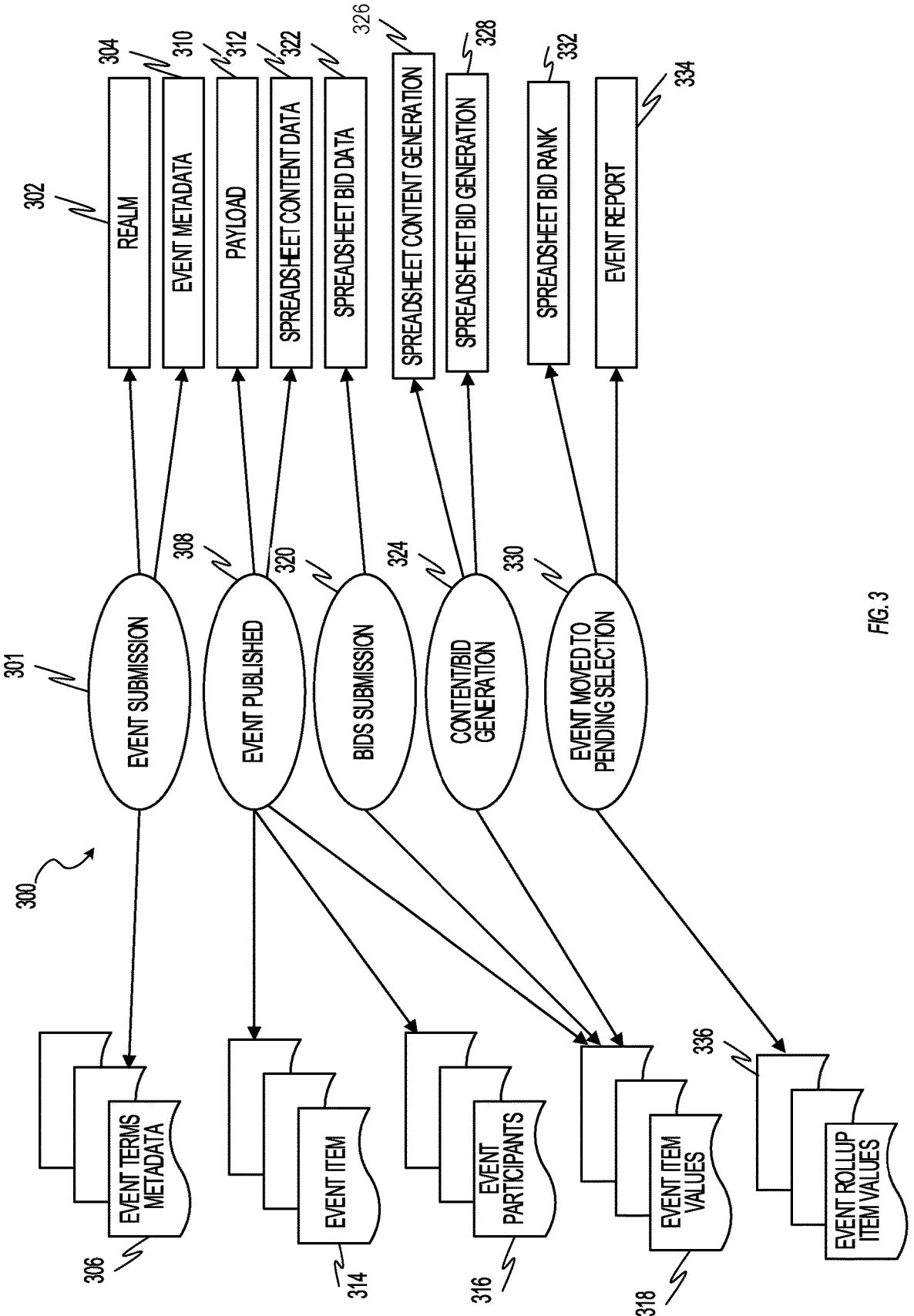
FIG. 3 is a block diagram illustrating a data model used by the document database, in an example embodiment.

FIG. 3 is a block diagram illustrating a data model 300 used by the document database 220, in an example embodiment. Here, an event submission event 301 may use realm information 302 and event metadata 304 from tables and create a document for each event term in collection 306. An event published event 308 may use payload information 310 and spreadsheet content data 312 to create a document for each event item in collection 314, as well as create a document for each event participant in collection 316, and a document for each event item value in collection 318. A bids submission event 320 may use spreadsheet bid data 322 to create a document for each event item value in collection 318. A content bid generation event 324 uses spreadsheet content generation data 326 and spreadsheet bid generation data 328 to create a document for each event item value in collection 318. Finally, an event moved to pending selection event 330 may use spreadsheet bid rank data 332 and event report data 334 to create a document for each event rollup item value in collection 336.

When an LLI event is received, it may be in the form of a large spreadsheet with rows representing each line item. Repetitive tasks like validation of each spreadsheet row, processing of each spreadsheet row, and transforming each spreadsheet row into a JSON document so that it can be saved in a document database may be performed concurrently (parallel processing) using, for example, a concurrent processing framework, such as Akka™. Akka™ is a toolkit and runtime that simplifies the construction of concurrent and distributed applications on a virtual machine. It focuses on actor-based concurrency. Actor-based concurrency treats an actor as the universal primate of concurrent computation. In response to a message it receives, an actor can make local decisions, create more actors, send more messages, and determine how to respond to the next message received. Actors may also modify their own private state, but can only affect each other indirectly through messaging (removing the need for lock-based synchronization).

In an example embodiment, there are several concurrent threads in round robin fashion for achieving the above functionalities.

In an example embodiment, communications among the various components are performed asynchronously, via a message broker, rather than synchronously.

As mentioned above, the graphical user interface 202 may be implemented at server-side. For further efficiency, the graphical user interface 202 may utilize cursor-based pagination. Here, line items are on the vertical access and bid values are on the horizontal access, and a user may scroll vertically or horizontally using a cursor.

Figure 4:
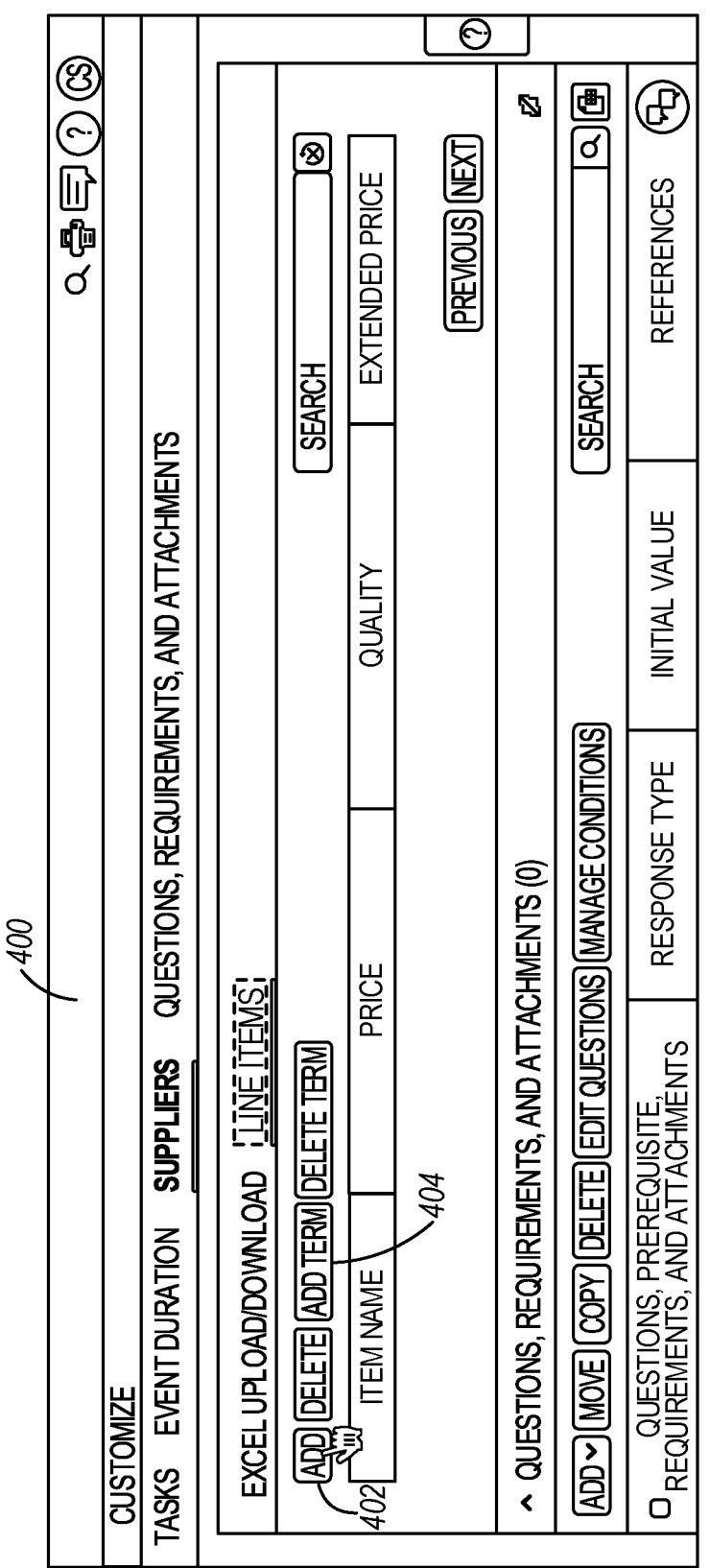
FIG. 4 is a screen capture illustrating a graphical user interface for adding line items to an LLI event, in accordance with an example embodiment.

FIG. 4 is a screen capture illustrating a graphical user interface 400 for adding line items to an LLI event, in accordance with an example embodiment. Here, the graphical user interface 400 provides the ability for a user to enter a line item by selecting an "add" button 402. Additionally, a term may be added to a line item by selecting an "add term" button 404.

Figure 5:
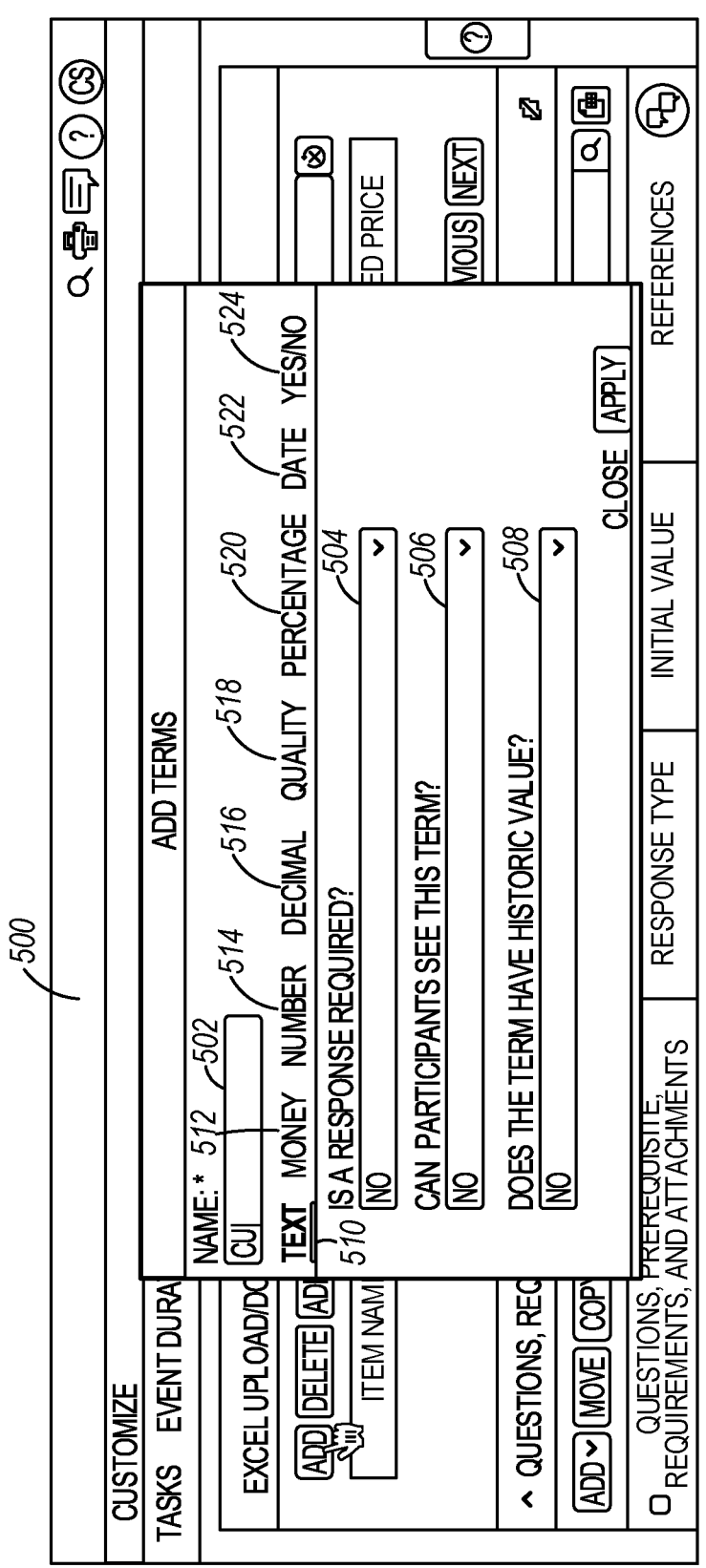
FIG. 5 is a screen capture illustrating a graphical user interface for adding terms to a line item of an LLI event, in accordance with an example embodiment.

FIG. 5 is a screen capture illustrating a graphical user interface 500 for adding terms to a line item of an LLI event, in accordance with an example embodiment. Here, the graphical user interface 500 provides the ability for a user to enter a name for a term in name field 502, as well as various aspects of the term in various drop downs 504, 506, 508 and buttons 510, 512, 514, 516, 518, 520, 522, and 524.

Figure 6:
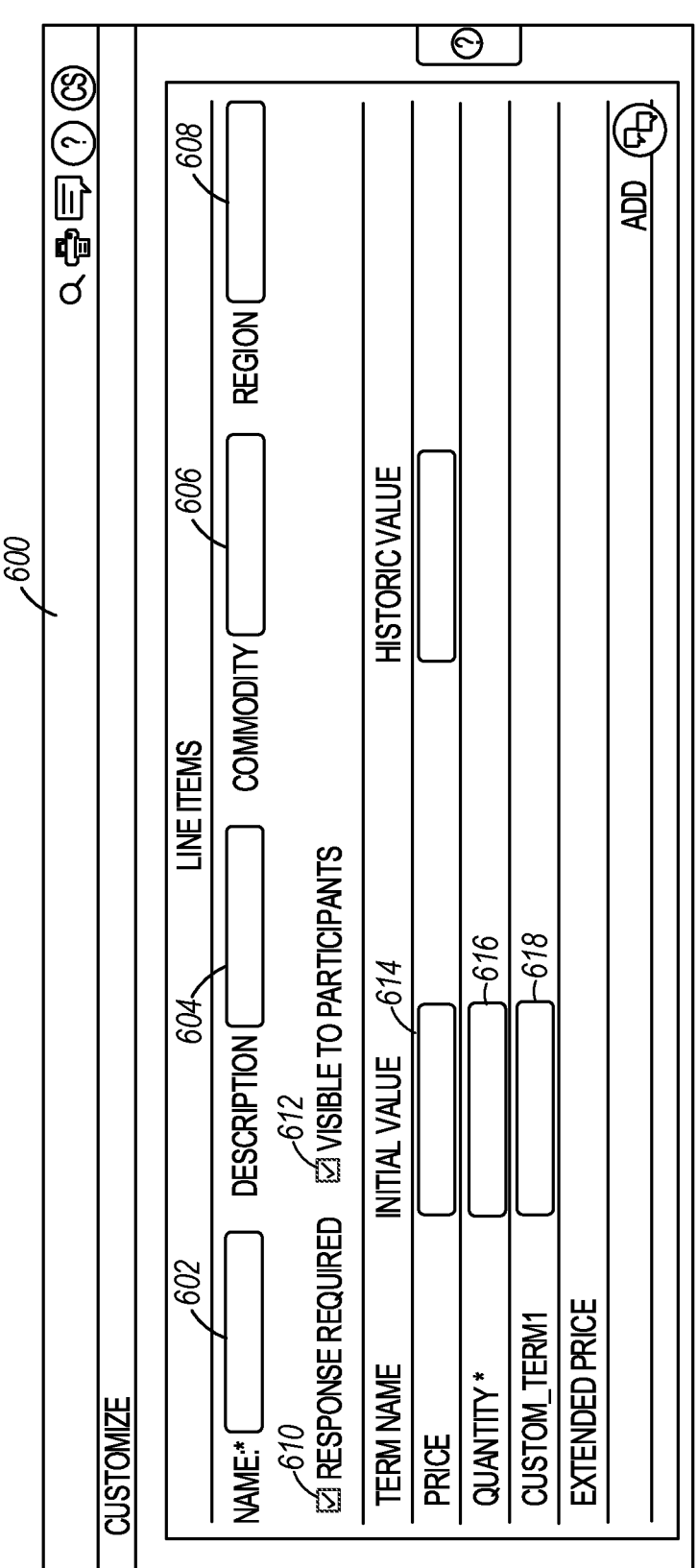
FIG. 6 is a screen capture illustrating a graphical user interface for adding line item information in accordance with an example embodiment.

FIG. 6 is a screen capture illustrating a graphical user interface 600 for adding line item information in accordance with an example embodiment. Here, the graphical user interface 600 provides the ability for a user to enter a name for a line item in name field 602, as well as a description 604, commodity 606, and region 608. Furthermore, checkboxes 610 and 612 allow the user to indicate whether a response is required and/or whether the line item is visible to participants, respectively. Additionally, initial values for various terms may be entered in fields 614, 616, and 618.

Figure 7:
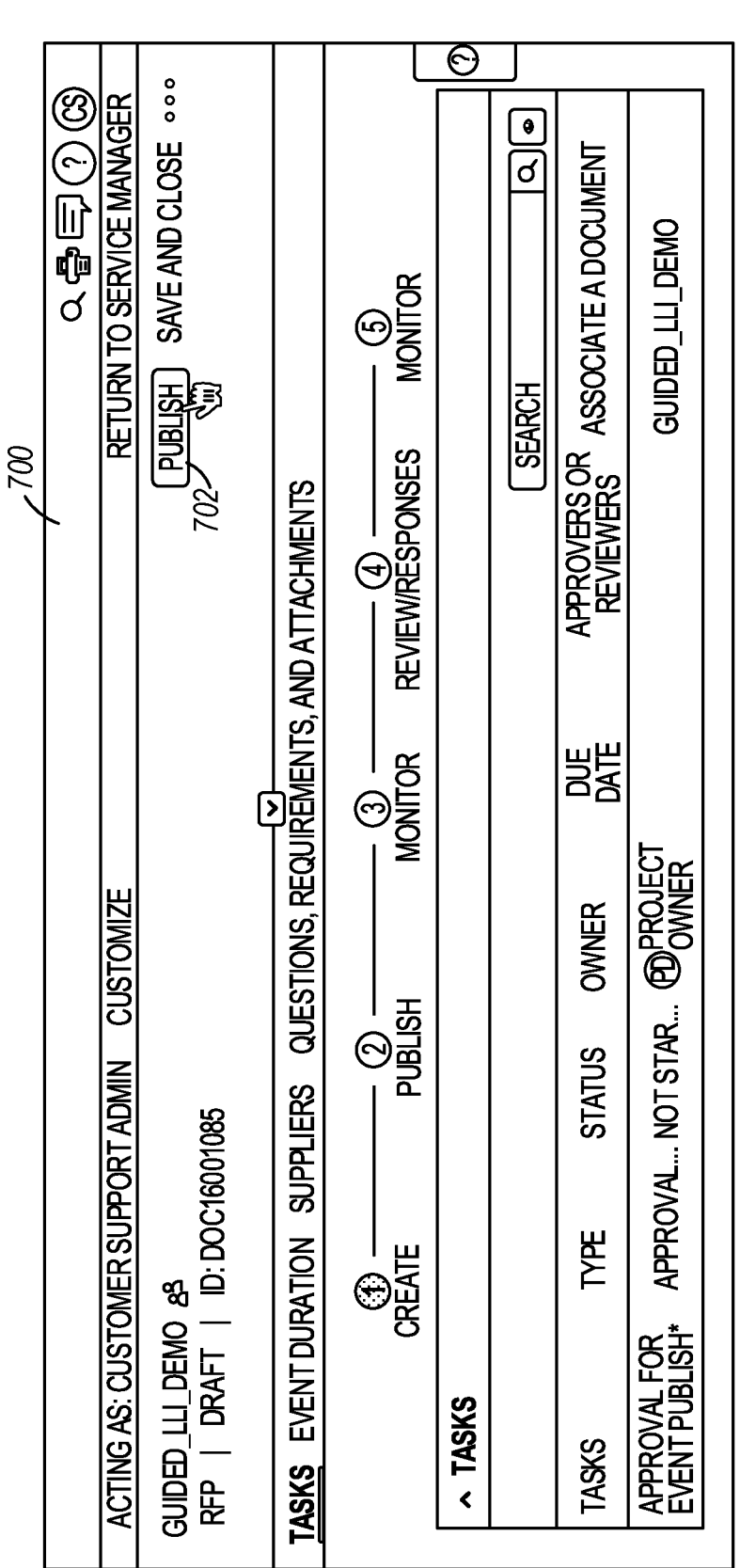
FIG. 7 is a screen capture illustrating a graphical user interface for publishing a created report, in accordance with an example embodiment.

FIG. 7 is a screen capture illustrating a graphical user interface 700 for publishing a created report, in accordance with an example embodiment. Here, the graphical user interface 700 permits a user to publish a created LLI event by pressing a publish button 702.

Figure 8:
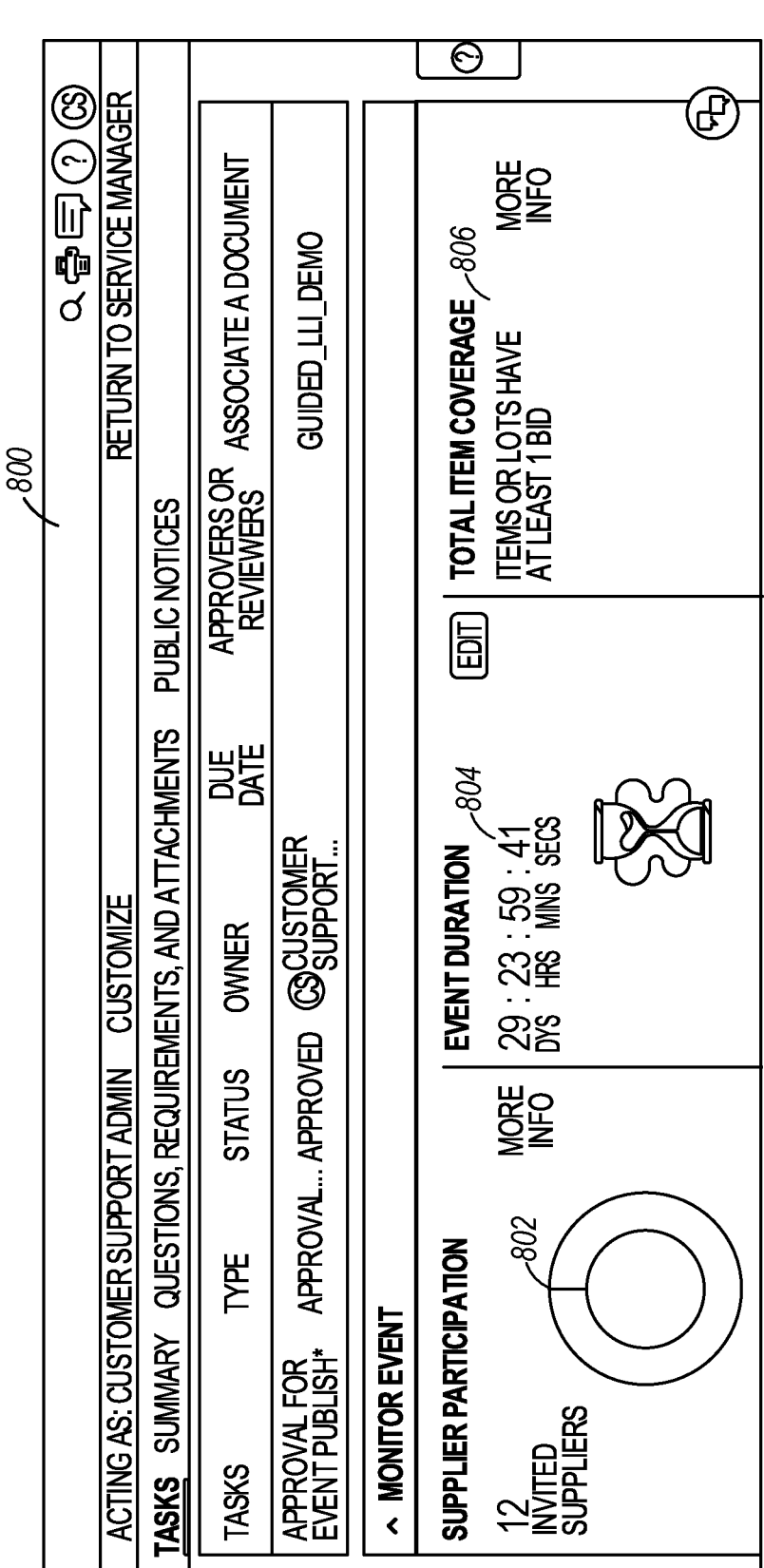
FIG. 8 is a screen capture illustrating a graphical user interface for viewing a report about data recorded via an LLI event, in accordance with an example embodiment.

FIG. 8 is a screen capture illustrating a graphical user interface 800 for viewing a report about data recorded via an LLI event, in accordance with an example embodiment. Here, the report may include a graph 802 of supplier participation, an indication 804 of how long the event has left (the event here being bidding), and an indication 806 of total item coverage. Other metrics may also be displayed in this graphical user interface 800, but are not pictured here for succinctness. Notably, all of this information may be retrieved from standard events (stored in a relational database) and/or LLI events (stored in a document database). As such, this graphical user interface 800 essentially integrates with existing graphical user interfaces that permit reports only from standard events (stored in a relational database) and not LLI events.

Figure 9:
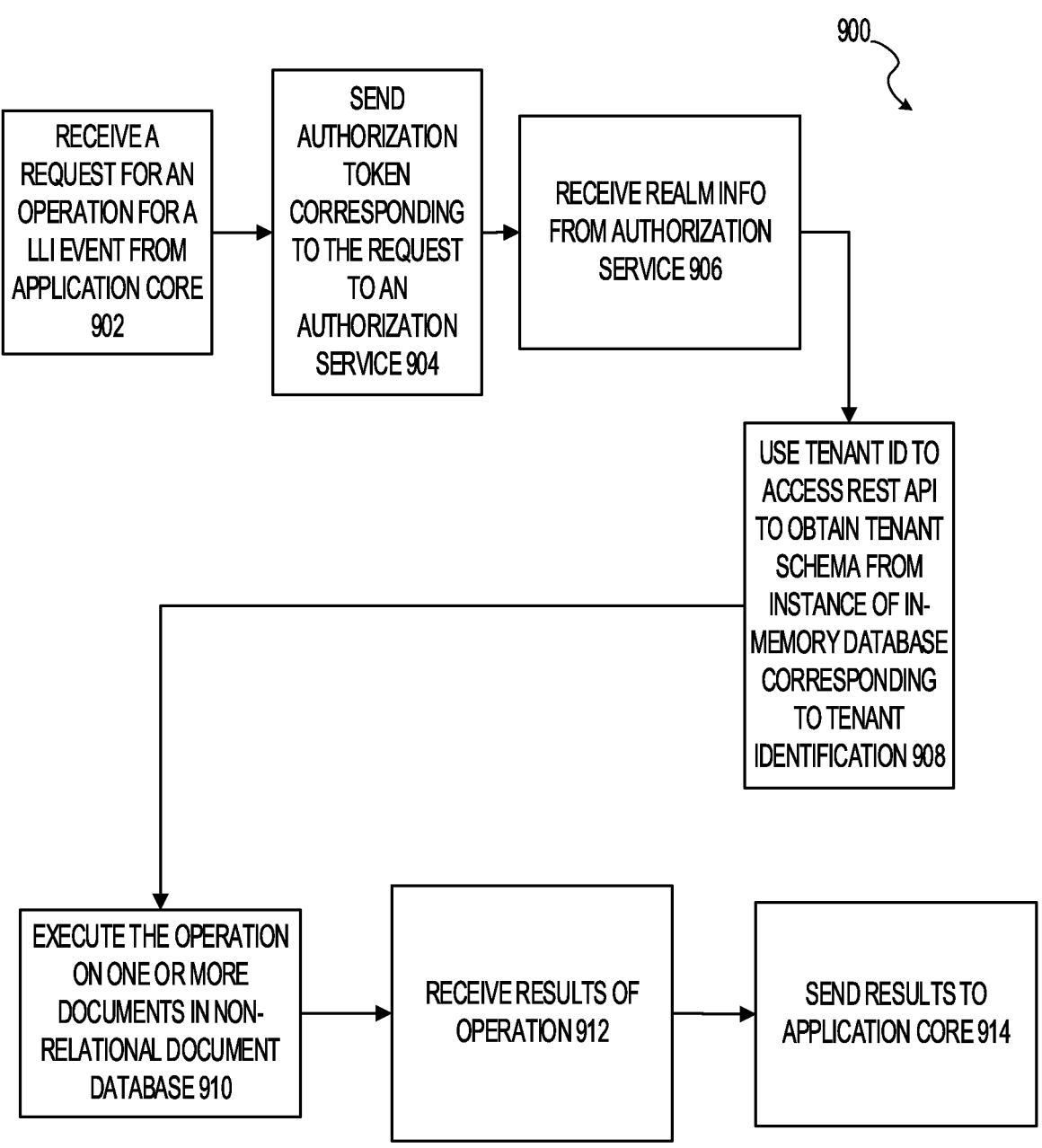
FIG. 9 is a flow diagram illustrating a method of handling a request for an operation corresponding to an LLI event, in accordance with an example embodiment.

FIG. 9 is a flow diagram illustrating a method 900 of handling a request for an operation corresponding to an LLI event, in accordance with an example embodiment. At operation 902, a request for an operation for a large line item (LLI) event is received from an application core, such as a sourcing application core. The request has been rerouted from the application core based on a determination that a request for an operation for an event corresponds to a LLI event, in accordance with a threshold defined for a large line item event at the application core. That threshold may specify a particular number of line items for an event, such as 2000, beyond which the event is considered a LLI event rather than a standard event.

At operation 904, an authorization token corresponding to the request for the operation for the LLI event is sent to an authorization service. At operation 906, realm information is received from the authorization service. The realm information may include a tenant identification. At operation 908, the tenant identification is used to access a REST API to obtain a tenant schema in an instance of an in-memory database corresponding to the tenant identification. The in-memory database contains both a non-relational document database and a relational database.

At operation 910, the operation is executed on one or more documents corresponding to the LLI event, the one or more documents stored in a collection in the non-relational document database. At operation 912, results of the operation are received from the non-relational document database. At operation 914, the results are sent to the application core for reporting to a user via a graphical user interface.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
receiving, from an application core, a request for an operation for a large line item (LLI) event, the request having been rerouted from the application core based on a determination that a request for an operation for an event corresponds to a LLI event, in accordance with a threshold defined for a large line item event at the application core;
executing the operation on one or more documents corresponding to the LLI event, the one or more documents stored in a collection in a non-relational document database;
receiving results of the operation from the non-relational document database; and
sending the results to the application core for reporting to a user via a graphical user interface.

Example 2. The system of Example 1, wherein the threshold indicates a number of line items in a sourcing event.

Example 3. The system of Example\2, wherein the sourcing event includes a plurality of line items, each line item having one or more terms defined by a procuring organization and having fields for each of the terms for completion by a bidding organization.

Example 4. The system of any of Examples 1-3, wherein the operations further comprise:

sending an authorization token corresponding to the request for the operation for the LLI event to an authorization service; and receiving, from the authorization service, realm information.

Example 5. The system of Example 4, wherein the realm information includes a tenant identification and wherein the operations further comprise:

using the tenant identification to access a representational state transfer (REST) application program interface (API) to obtain a tenant schema in an instance of an in-memory database corresponding to the tenant identification.

Example 6. The system of Example 5, wherein the in-memory database contains the non-relational document database and a relational database used to store metadata regarding the LLI event.

Example 7. The system of any of Examples 1-6, wherein the executing the operation includes executing the operation on a plurality of line items within the LLI event simultaneously via multiple concurrent threads.

Example 8. A method comprising:

receiving, from an application core, a request for an operation for a large line item (LLI) event, the request having been rerouted from the application core based on a determination that a request for an operation for an event corresponds to a LLI event, in accordance with a threshold defined for a large line item event at the application core;

executing the operation on one or more documents corresponding to the LLI event, the one or more documents stored in a collection in a non-relational document database;

receiving results of the operation from the non-relational document database; and sending the results to the application core for reporting to a user via a graphical user interface.

Example 9. The method of Example 8, wherein the threshold indicates a number of line items in a sourcing event.

Example 10. The method of Example 9, wherein the sourcing event includes a plurality of line items, each line item having one or more terms defined by a procuring organization and having fields for each of the terms for completion by a bidding organization.

Example 11. The method of any of Examples 8-10, further comprising:

sending an authorization token corresponding to the request for the operation for the LLI event to an authorization service; and receiving, from the authorization service, realm information.

Example 12. The method of Example 11, wherein the realm information includes a tenant identification and wherein the method further comprises:

using the tenant identification to access a representational state transfer (REST) application program interface (API) to obtain a tenant schema in an instance of an in-memory database corresponding to the tenant identification.

Example 13. The method of Example 12, wherein the in-memory database contains the non-relational document database and a relational database used to store metadata regarding the LLI event.

Example 14. The method of any of Examples 8-13, wherein the executing the operation includes executing the operation on a plurality of line items within the LLI event simultaneously via multiple concurrent threads.

Example 15. A non-transitory machine-readable medium storing instructions which, when executed by one or more processors, cause the one or more processors to perform operations comprising:

receiving, from an application core, a request for an operation for a large line item (LLI) event, the request having been rerouted from the application core based on a determination that a request for an operation for an event corresponds to a LLI event, in accordance with a threshold defined for a large line item event at the application core;

executing the operation on one or more documents corresponding to the LLI event, the one or more documents stored in a collection in a non-relational document database;

receiving results of the operation from the non-relational document database; and sending the results to the application core for reporting to a user via a graphical user interface.

Example 16. The non-transitory machine-readable medium of Example 15, wherein the threshold indicates a number of line items in a sourcing event.

Example 17. The non-transitory machine-readable medium of Example 16, wherein the sourcing event includes a plurality of line items, each line item having one or more terms defined by a procuring organization and having fields for each of the terms for completion by a bidding organization.

Example 18. The non-transitory machine-readable medium of any of Examples 15-17, wherein the operations further comprise:

sending an authorization token corresponding to the request for the operation for the LLI event to an authorization service; and receiving, from the authorization service, realm information.

Example 19. The non-transitory machine-readable medium of Example 18, wherein the realm information includes a tenant identification and wherein the operations further comprise:

using the tenant identification to access a representational state transfer (REST) application program interface (API) to obtain a tenant schema in an instance of an in-memory database corresponding to the tenant identification.

Example 20. The non-transitory machine-readable medium of Example 19, wherein the in-memory database contains the non-relational document database and a relational database used to store metadata regarding the LLI event.

Figure 10:
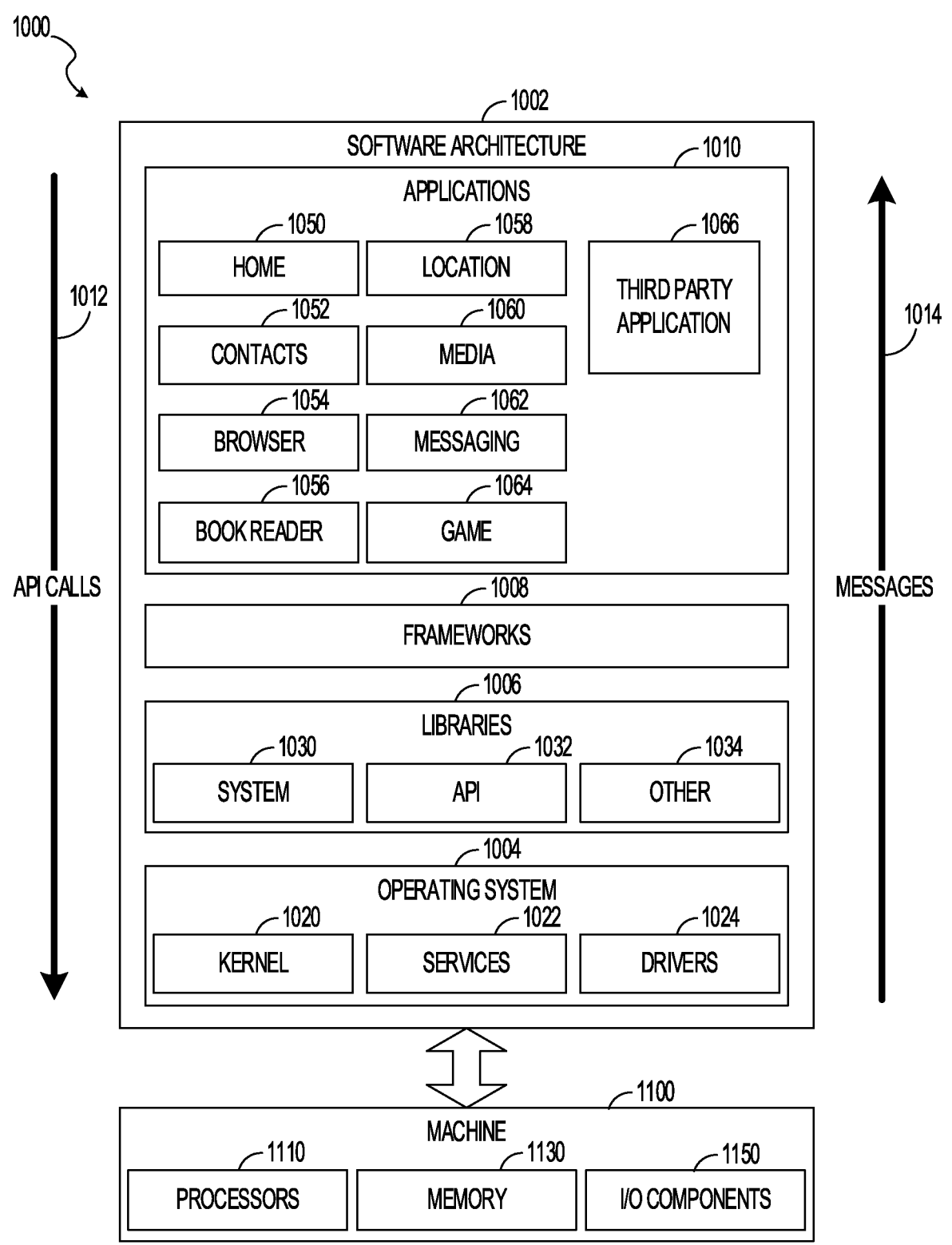
FIG. 10 is a block diagram illustrating a software architecture, which can be installed on any one or more of the devices described above.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/ output (I/O) components 1150. In this example architecture, the software architecture 1002 of FIG. 10 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke Application Program Interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionalities. The services 1022 can provide other common services for the other software layers. The drivers 1024 are responsible for controlling or interfacing with the underlying hardware. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. The applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1066 can invoke the API calls 1012 provided by the operating system 1104 to facilitate functionality described herein.

Figure 11:
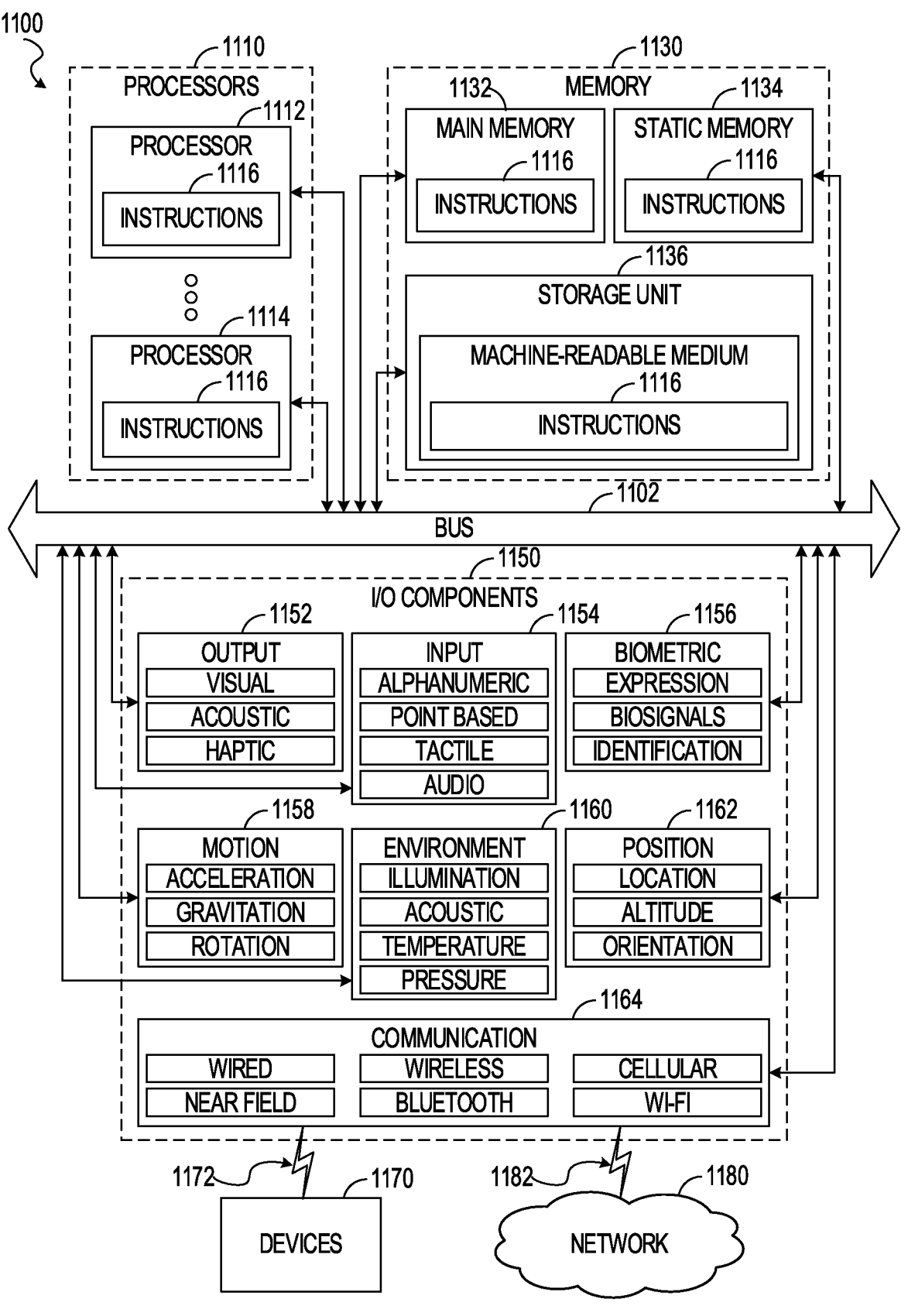
FIG. 11 illustrates a diagrammatic representation of a machine in the form of a computer system within which a set of instructions may be executed for causing the machine to perform any one or more of the methodologies discussed herein.

FIG. 11 illustrates a diagrammatic representation of a machine 1100 in the form of a computer system within which a set of instructions may be executed for causing the machine 1100 to perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the method of FIG. 9. Additionally, or alternatively, the instructions 1116 may implement FIGS. 1-9 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth.

The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of several well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal"

means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a non-transitory computer-readable medium storing instructions that, when executed by the at least one hardware processor, cause the at least one hardware processor to perform operations comprising:

receiving, at an application core, from a message broker, an request for an operation for an event asynchronously published by the message broker, the event being a large line item (LLI) event;

determining, at the application core, that the operation cannot be processed by the application core within a specific amount of time due to a server cache holding up events in memory;

based on the determining, rerouting the request to a content service separate and distinct from the application core, the application core being an enterprise resource processing (ERP) system running with an in-memory database, the content service being a microservice-based stack;

executing, by the content service, the operation on one or more documents corresponding to the LLI event, the one or more documents stored in a collection in a non-relational document database, the executing performed based on metadata stored in a relational database;

receiving, by the content service, results of the operation from the non-relational document database; and sending, by the content service, the results to the application core for reporting to a user via a graphical user interface.

2. The system of claim 1, wherein the determining is at least partly based on a number of line items in a sourcing event.

3. The system of claim 2, wherein the sourcing event includes a plurality of line items, each line item having one or more terms defined by a procuring organization and having fields for each of the terms for completion by a bidding organization.

4. The system of claim 1, wherein the operations further comprise:

sending an authorization token corresponding to the request for the operation for the LLI event to an authorization service; and receiving, from the authorization service, realm information.

5. The system of claim 4, wherein the realm information includes a tenant identification and wherein the operations further comprise:

using the tenant identification to access a representational state transfer (REST) application program interface (API) to obtain a tenant schema in an instance of an in-memory database corresponding to the tenant identification.

6. The system of claim 5, wherein the in-memory database contains the non-relational document database and the relational database.

7. The system of claim 1, wherein the executing the operation includes executing the operation on a plurality of line items within the LLI event simultaneously via multiple concurrent threads.

8. A method comprising:

receiving, at an application core, from a message broker, an request for an operation for an event asynchronously published by the message broker, the event being a large line item (LLI) event;

determining, at the application core, that the operation cannot be processed by the application core within a specific amount of time due to a server cache holding up events in memory;

based on the determining, rerouting the request to a content service separate and distinct from the application core, the application core being an enterprise resource processing (ERP) system running with an in-memory database, the content service being a microservice-based stack;

executing, by the content service, the operation on one or more documents corresponding to the LLI event, the one or more documents stored in a collection in a non-relational document database, the executing performed based on metadata stored in a relational database;

receiving, by the content service, results of the operation from the non-relational document database; and sending, by the content service, the results to the application core for reporting to a user via a graphical user interface.

9. The method of claim 8, wherein the determining is at least partly based on a number of line items in a sourcing event.

10. The method of claim 9, wherein the sourcing event includes a plurality of line items, each line item having one or more terms defined by a procuring organization and having fields for each of the terms for completion by a bidding organization.

11. The method of claim 8, further comprising:

sending an authorization token corresponding to the request for the operation for the LLI event to an authorization service; and receiving, from the authorization service, realm information.

12. The method of claim 11, wherein the realm information includes a tenant identification and wherein the method further comprises:

using the tenant identification to access a representational state transfer (REST) application program interface (API) to obtain a tenant schema in an instance of an in-memory database corresponding to the tenant identification.

13. The method of claim 12, wherein the in-memory database contains the non-relational document database and the relational database.

14. The method of claim 8, wherein the executing the operation includes executing the operation on a plurality of line items within the LLI event simultaneously via multiple concurrent threads.

15. A non-transitory machine-readable medium storing instructions which, when executed by one or more processors, cause the one or more processors to perform operations comprising:

receiving, at an application core, from a message broker, an request for an operation for an event asynchronously published by the message broker, the event being a large line item (LLI) event;

determining, at the application core, that the operation cannot be processed by the application core within a specific amount of time due to a server cache holding up events in memory;

based on the determining, rerouting the request to a content service separate and distinct from the application core, the application core being an enterprise resource processing (ERP) system running with an in-memory database, the content service being a microservice-based stack;

executing, by the content service, the operation on one or more documents corresponding to the LLI event, the one or more documents stored in a collection in a non-relational document database, the executing performed based on metadata stored in a relational database;

receiving, by the content service, results of the operation from the non-relational document database; and sending, by the content service, the results to the application core for reporting to a user via a graphical user interface.

16. The non-transitory machine-readable medium of claim 15, wherein the determining is at least partly based on a number of line items in a sourcing event.

17. The non-transitory machine-readable medium of claim 16, wherein the sourcing event includes a plurality of line items, each line item having one or more terms defined by a procuring organization and having fields for each of the terms for completion by a bidding organization.

18. The non-transitory machine-readable medium of claim 15, wherein the operations further comprise:

sending an authorization token corresponding to the request for the operation for the LLI event to an authorization service; and receiving, from the authorization service, realm information.

19. The non-transitory machine-readable medium of claim 18, wherein the realm information includes a tenant identification and wherein the operations further comprise:

using the tenant identification to access a representational state transfer (REST) application program interface (API) to obtain a tenant schema in an instance of an in-memory database corresponding to the tenant identification.

20. The non-transitory machine-readable medium of claim 19, wherein the in-memory database contains the non-relational document database and the relational database.

* * * * *